(12) United States Patent
Christophersen et al.

(10) Patent No.: US 11,608,630 B2
(45) Date of Patent: Mar. 21, 2023

(54) CAST-IN PLACE ANCHOR WITH LOCKABLE JAW ASSEMBLY

(71) Applicant: BLACK & DECKER INC., New Britain, CT (US)

(72) Inventors: Kyle Christophersen, Lutherville-Timonium, MD (US); Mark J. Serokosz, New Fairfield, CT (US); Wander Rivera, Danbury, CT (US); Robert LaBarbera, New Rochelle, NY (US); Qiang Zhang, Lutherville-Timonium, MD (US)

(73) Assignee: BLACK & DECKER INC., New Britain, CT (US)

( * ) Notice: Subject to any disclaimer, the term of this patent is extended or adjusted under 35 U.S.C. 154(b) by 357 days.

(21) Appl. No.: 16/798,849

(22) Filed: Feb. 24, 2020

(65) Prior Publication Data
US 2020/0325673 A1 Oct. 15, 2020

Related U.S. Application Data

(60) Provisional application No. 62/833,024, filed on Apr. 12, 2019.

(51) Int. Cl.
*E04B 1/41* (2006.01)
*F16B 37/08* (2006.01)
*F16B 39/36* (2006.01)

(52) U.S. Cl.
CPC ........ *E04B 1/4121* (2013.01); *F16B 37/0857* (2013.01); *F16B 39/36* (2013.01); *F16B 2200/403* (2018.08)

(58) Field of Classification Search
None
See application file for complete search history.

(56) References Cited

U.S. PATENT DOCUMENTS

| 5,015,133 | A | * | 5/1991 | Arena | F16B 35/00 |
| | | | | | 411/433 |
| 5,282,709 | A | * | 2/1994 | Chaput | F16B 31/00 |
| | | | | | 411/270 |
| 5,613,816 | A | * | 3/1997 | Cabahug | F16B 37/0857 |
| | | | | | 411/270 |
| 2010/0129178 | A1 | * | 5/2010 | Smith | F16B 37/0857 |
| | | | | | 411/436 |

(Continued)

OTHER PUBLICATIONS

European Extended Search Report dated Sep. 9, 2020.

*Primary Examiner* — Joshua K Ihezie
(74) *Attorney, Agent, or Firm* — Kofi A. Schulterbrandt (57) ABSTRACT

An anchor assembly is disclosed for suspending objects to a concrete structure. The assembly includes an anchor housing having a jaw assembly therein and a opening for receiving an anchor member such as a threaded rod. The jaw assembly includes threaded rods having a threaded opening, a wood form anchor assembly and a metal decking anchor assembly. The wood form and the metal decking anchor assemblies may accommodate the anchor housing and the anchor housing is used in one of the wood form anchor assembly and the metal decking anchor assembly. The metal decking anchor assembly includes a nose-piece and the anchor housing is selectively connectable to the nose-piece via a locking connection such as a bayonet connection.

13 Claims, 5 Drawing Sheets

(56) References Cited

U.S. PATENT DOCUMENTS

| | | | |
|---|---|---|---|
| 2010/0166525 A1* | 7/2010 | Dvorak | F16B 37/0864 |
| | | | 411/433 |
| 2015/0275956 A1* | 10/2015 | Oh | F16B 37/0821 |
| | | | 411/324 |
| 2016/0326738 A1 | 11/2016 | Lin | |
| 2018/0298938 A1* | 10/2018 | Droste | F16B 39/36 |
| 2018/0356033 A1* | 12/2018 | Schramm | E04B 1/4121 |
| 2019/0078607 A1* | 3/2019 | Quinn | F16B 39/32 |
| 2019/0285105 A1* | 9/2019 | Wiley | F16B 13/124 |
| 2020/0325673 A1* | 10/2020 | Christophersen | F16B 37/0857 |

* cited by examiner

CAST-IN PLACE ANCHOR WITH LOCKABLE JAW ASSEMBLY

CROSS-REFERENCE TO RELATED APPLICATIONS

This application claims priority from U.S. Provisional Application No. 62/833,024, filed Apr. 12, 2019, the disclosure of which is incorporated herein by reference in its entirety.

FIELD

This specification relates to a cast-in-place anchor assembly for connecting objects to a metal deck or wood form after concrete pouring and concrete setting.

BACKGROUND

The WoodKnocker® II and Bang-It®+products are cast-in-place anchor assemblies available for purchase and aspects of the present invention are conceived to improve upon this product. In the recent past Applicant has filed patent applications with subject matter generally related to the present application. U.S. patent application Ser. No. 16/002,099, filed Jun. 7, 2018, and entitled Cast-In Place Anchor Assembly covers a cast-in place anchor the disclosure of which is incorporated herein by reference in its entirety. In addition, U.S. patent application Ser. No. 15/923,052, filed on Mar. 16, 2018, and entitled Snap Nut Concrete Anchor Assembly also covers a cast-in-place-anchor the disclosure of which is incorporated herein by reference. Furthermore, U.S. patent application Ser. No. 15/948,131, filed on Apr. 9, 2018, and entitled Snap Nut Concrete Anchor Assembly also covers a cast-in-place-anchor the disclosure of which is incorporated herein by reference.

There are two different conventional types of cast-in-place anchors. A first type is secured in position adjacent to a wooden concrete forming boundary and a second type secures is secured in position adjacent to metal decking (e.g., floor slab metal decking). After concrete pouring and setting each of these two types of cast-in-place anchors provide an anchoring point to which an object (e.g., a threaded rod) can be anchored. Both types of anchor include an anchor housing (which transfers load to the concrete) and a jaw assembly arranged in the anchor housing. After securing a threaded rod within the jaws of a set anchor assembly, load applied to the threaded rod can be transferred to the jaws of the jaw assembly which in turn transfer load to the anchor housing. The anchor housing may include a flange which is ultimately embeddes in the cured concrete and which helps to transfer load from the anchor housing to the cured concrete.

In both types of conventional cast-in-place anchors discussed above, the anchors provide an anchoring point adjacent to the metal decking or to the wood form. Specifically, the anchoring point may be an insertion opening of the anchor which is positioned adjacent the metal decking or wood form. After setting, an anchor member (e.g., a threaded rod) may be inserted through/into the insertion opening to the jaw assembly which (as mentioned above) is housed within the anchor housing. As the anchor member is inserted, the jaw assembly engages the anchor member to secure the anchor member to the anchor and thereby to the cured concrete.

Conventional split nut jaw assemblies will often employ a spring above the jaws and downwardly biasing the jaws. The spring also allows the jaws to be urged at least slightly upward during insertion of the anchor member. The axial positioning flexibility of the jaws enhances the engagement process by affording the jaws significant compliance flexibility. Unfortunately, in certain load scenarios the axial up and down play could work to compromise the connection between the jaws and the anchor member.

In a seismic event or other vibratory circumstances such as copious fluid discharge, the concrete may be thrust up and down by forces having components along the axial/longitudinal direction of the anchor. In that case, a load supported on a threaded anchor member (e.g., plumbing piping suspended from a ceiling) may exert a dynamic reactionary force on the jaw assembly of the anchor housing. For example, the load being supported by the threaded anchor could apply a reverse longitudinal/axial impact force to the jaws. In a seismic event, if the jaws are able to move axially within and relative to the anchor housing, the jaws could be forced into impact engagement with upper and lower limits of the anchor housing. This impact engagement could compromise the connection between the jaws and anchor member resulting in a failed jaw/anchor member connection. Specifically, if the jaw assembly design is one of a split nut design, dynamic impacts could cause the threaded jaws to separate, fatigue, shear threads and lose hold of the anchor member (e.g., threaded rod). One solution to preventing the jaws from moving relative to the anchor housing is to include a washer and a nut on the threaded rod so that the washer is adjacent the lower surface of the metal decking or adjacent to the concrete (after wood form removal) and the nut is threaded onto the rod adjacent to the washer. With this arrangement, any upward load from the threaded rod gets transferred to the nut then to the washer and then to the metal decking or wood form and cured concrete slab. The load is not transferred through the jaws.

SUMMARY

According to an aspect of the present invention, to allow desirable axial movement for initial connection, but thereafter to prevent the threaded anchor member from displacing the jaws upward relative to the anchor housing in a seismic event, it would be beneficial to provide a jaw lock. The jaw lock may include an axially expandable member which has a first smaller radius and is capable of flexible expansion to a second larger radius. Furthermore, the jaw assembly or anchor housing may include a space into which the jaw lock may expand such that expansion into that locking space prevents further axial movement of the jaw lock in at least one axial direction (e.g., upward). When the jaw lock is expanded and locked into the locking space, the jaw lock may also be positioned above and generally adjacent an upper side of the jaws which prevents the jaws from moving axially upward. While the reconfiguration of the jaw lock may be an expanding reconfiguration, it may also be a contracting reconfiguration.

Here, an upward load applied to a threaded rod engaged with the jaws gets transferred to the jaws then to the jaw lock and then to the anchor housing and thereby to the cured concrete. Locking the jaws relative to the anchor housing removes the axial play and limits or prevents the jaws from dynamically impacting the anchor housing. The jaws are thereby essentially immobilized relative to the anchor housing between the anchor housing and the jaw lock.

In another aspect of the present invention, a separator is provided on the jaws to encourage even and adequate separation of the jaws as the threaded anchor member is inserted into the jaws. The separator may take the form of an inclined projections at a bottom end of the jaws which. When the threaded anchor member engages the separator, the threaded anchor member applies engages the separators to apply an outward force generally perpendicular to a separation axis of the split jaws.

BRIEF DESCRIPTION OF THE DRAWINGS

Embodiments will now be described by way of non-limiting example with reference to the accompanying drawings in which.

DETAILED DESCRIPTION

Figure 1A:
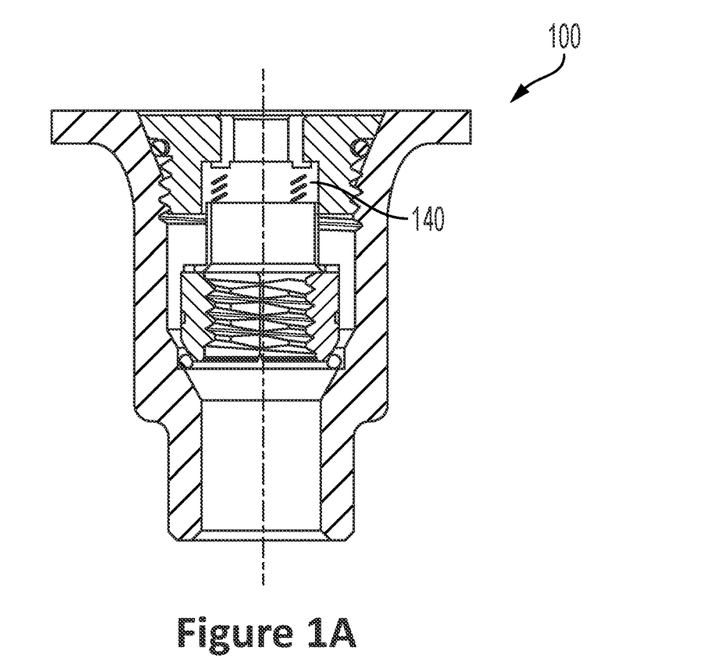
FIG. 1A is a side cross-sectional view of a first embodiment of an anchor assembly of the present invention in an unlocked or pre-set configuration.
Figure 1B:
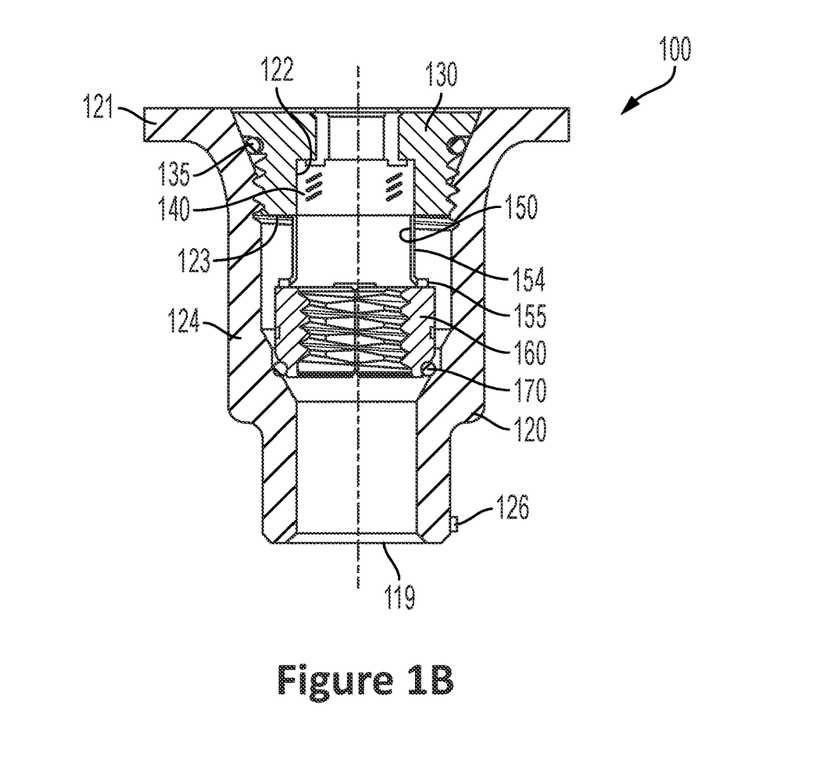
FIG. 1B is a side cross-sectional view of the anchor assembly of FIG. 1A in a locked or set configuration.
Figure 2:
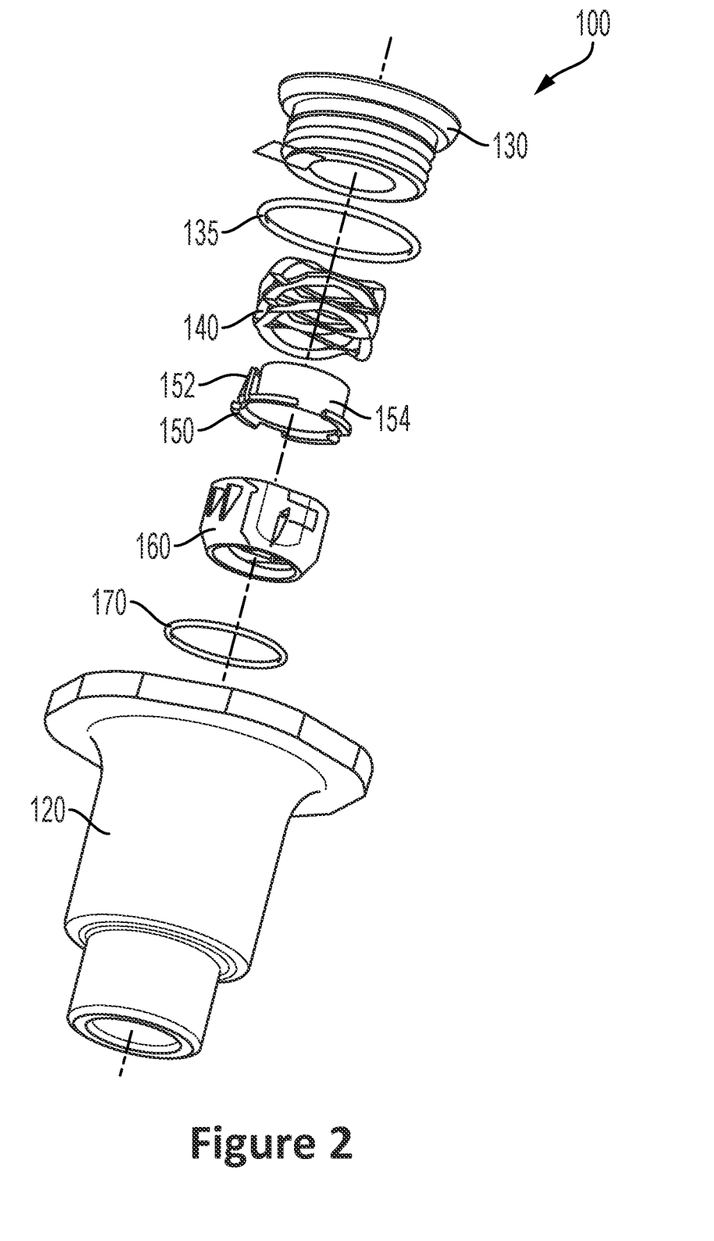
FIG. 2 is an exploded bottom perspective view of the anchor assembly of FIG. 1A.

A first embodiment of an anchor assembly for a cast-in-place metal deck or a cast-in-place wood form for constraining a threaded anchor member to the cast concrete is illustrated in FIGS. 1A and 1B and 2. Anchor assembly 100 includes an anchor housing 120, a cover 130, and an o-ring 135 (e.g., rubber or flexible o-ring) for sealing between anchor housing 120 and cover 130. Anchor housing 120 and cover 130 define a cavity which houses a jaw assembly. The jaw assembly includes a spring 140, a lock member 150 separable jaws 160 and a compressible member such as a flexible (e.g. rubber) o-ring or a jaw-ring 170.

Anchor housing 120 may be made of metal or other suitable material depending on the application and required anchor assembly strength. Anchor housing 120 may include an outwardly extending radial flange 121 at an upper end thereof. At a lower end, anchor housing 120 may also include an opening 119 therein along a longitudinal axis thereof for receiving an elongate load bearing member (e.g., a threaded rod). On the anchor housing 120 at a lower end of the jaw assembly cavity is a well known tapered surface which directs separable jaws 160 together as spring 140 urges separable jaws 160 downward.

Lock member 150 may include an axially extending cylindrical wall 154 with an outwardly extending flange 155 at a bottom thereof extending from cylindrical wall 154. An expansion slot 152 is disposed axially through the lock member from top to bottom of the lock member 150 so that edges of the walls 154 that define slot 152 may be flexibly forced toward and away from each other. As the edges move closer and away from each other, cylindrical wall 154 assumes various radial sizes (i.e., diameters).

Cover 130 may be male threaded and may be threadably received into female threads in an inner upper surface of the anchor housing. O-ring 135 may be flexible and may be seated in a ring slot in cover 130. When cover 130 is threaded onto an upper portion of anchor housing 120, o-ring 135 is compressed between cover 150 and a sealing surface of anchor housing 120 to prevent ingress of concrete particles which would enter the jaw assembly.

When assembly 100 is assembled as shown in FIGS. 1A and 1B, jaw-ring 170 is set in a jaw slot on a lower inclined/tapered surface of anchor housing 120. Lower ends of separable jaws 160 are then slid together along the tapered surface and interlocked to form a central threaded passage. Bottom ends of separable threaded jaws 160 rest on top of jaw-ring 170 so that a downward force applied to separable jaws 160 may displace separable jaws 160 further toward the tapered surfaces against the compressed bias force of jaw-ring 170. A lower portion of lock member 150 may sit adjacent to or on top of separable jaws 160.

Anchor 100 may take two configurations. In a first pre-set configuration of anchor assembly 100 shown in FIG. 1A, an axially extending outer surface of cylindrical wall 154 of lock member 150 fits within an axially extending inner wall 122 of cover 130. At a lower end of axially extending inner wall 122, is a horizontal ledge 123. Ledge 123 may extend radially outward to an inner axially extending wall of anchor housing 120.

A lower end of spring 140 engages an upper end of lock member 150. An upper end of spring 140 engages a lower surface of cover 130. When spring 140 is compressed between cover 130 and lock member 150, it forces/urges an upper extremity of lock member 150 toward ledge 123. During assembly (as discussed above) edges of lock member may be flexibly squeezed together to reduce the diameter of cylindrical wall 154 until wall 154 is reduced to a diameter smaller than axially extending inner wall 122 of cover 130. Wall 154 of lock member 150 can then be positioned in cover 130 and slide axially within cover 130.

When the jaw assembly is at rest in the unlocked configuration of FIG. 1A, the wall 154 expands radially into engagement with cover 130. To reconfigure anchor assembly 100 into the second post-set configuration shown in FIG. 1B, a topmost extent of cylindrical wall 154 of lock member 150 must pass below, or clear ledge 123 as lock member 150 is urged downward toward separable jaws 160. During assembly of the anchor member into an installed anchor, the anchor member, is inserted into opening 119 until it fully engages with separable jaws 160. After locking engagement between jaws 160 and anchor member is achieved, a downward load can be applied to the anchor member and then transferred to the jaws 160 to place a downward force on the jaws 160. As mentioned above, a sufficient downward force on the jaws will cause jaws 160 to move closer to inclined ramps of anchor housing 120, compressing flexible jaw-ring 170. The axial distance of compression of jaw-ring 170 is sufficient to lower the top of cylindrical wall 154 of lock member 150 below ledge 123. When the upper end of lock member 150 clears ledge 123 it flexes radially outward and expands to a configuration that is larger than the ledge opening in cover 130. The diameter formed by wall 154 is larger than the diameter of ledge 123. Therefore, a top of wall 154 abuts a horizontal surface of ledge 123 to prevent lock member 150 from moving upward axially. In other words, jaw-ring 170 flexibly pushes a bottom of separable jaws upward, separable jaws engage a bottom of lock member 150, and a top of lock member 150 is constrained from moving upward by ledge 123 of cover 130. Separable jaws 160 are therefor trapped between lock member 150 and flexible jaw-ring 170.

Figure 3A:
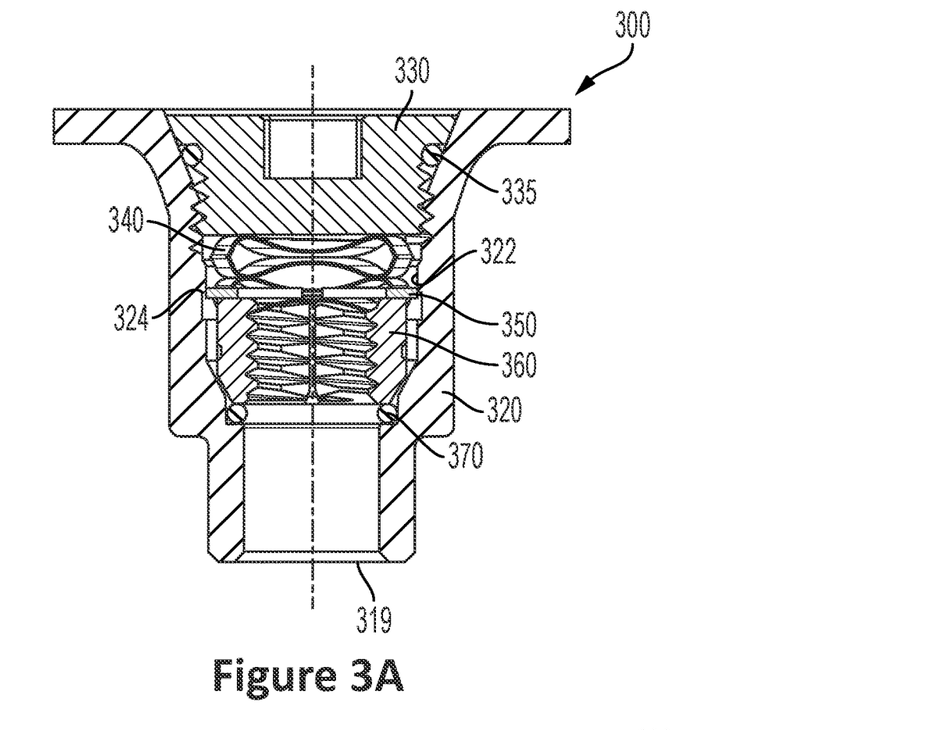
FIG. 3A is a side cross-sectional view of a second embodiment of an anchor assembly of the present invention in an unlocked or pre-set configuration.
Figure 3B:
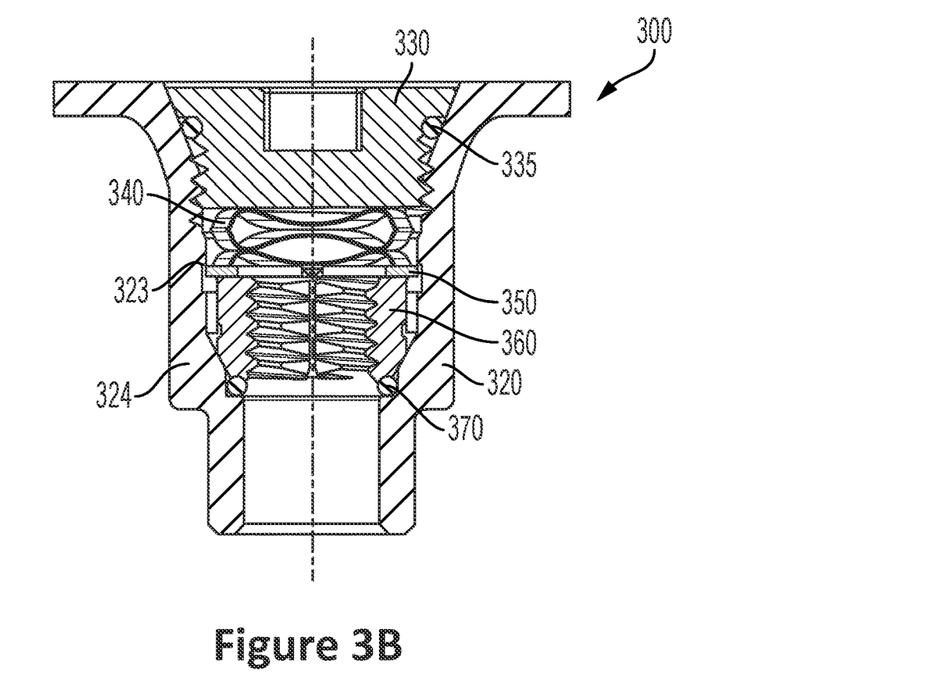
FIG. 3B is a side cross-sectional view of the anchor assembly of FIG. 3A in a locked or post-set configuration.
Figure 4A:
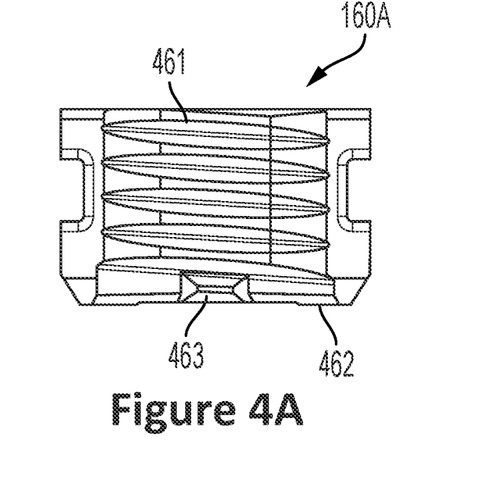
FIG. 4A discloses a side view of a first half of the split jaw assembly of FIGS. 1A and 2A.
Figure 4B:
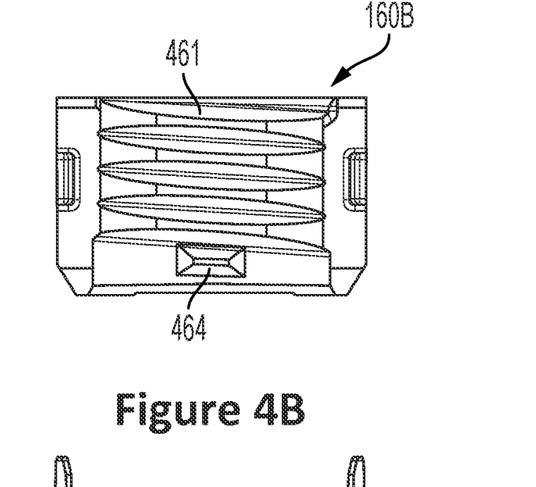
FIG. 4B discloses a side view of a second half of the split jaw assembly of FIGS. 1A and 2A.
Figure 5A:
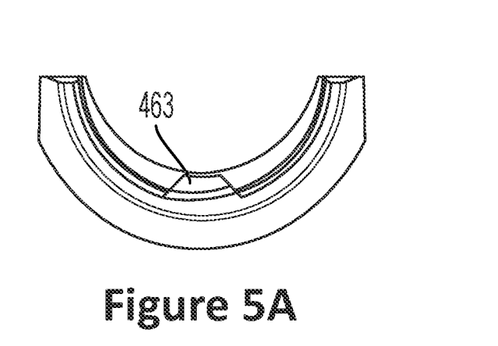
FIG. 5A discloses a bottom view of the jaw half of FIG. 4A.
Figure 5B:
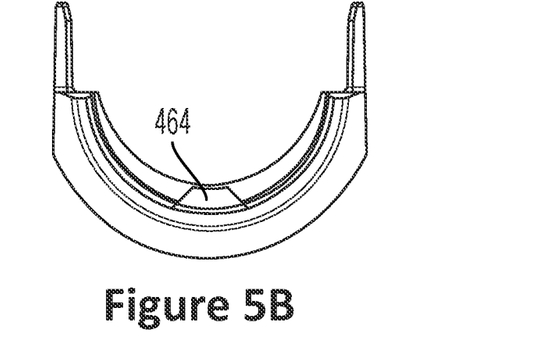
FIG. 5B discloses a bottom view of the jaw half of FIG. 4B.

FIG. 3A shows a second embodiment of the invention of FIGS. 1A and 1B. The main difference between the embodiments being the structure of the locking member. Otherwise, the inventions work generally similarly with FIGS. 3A and 3B including reference numbers in the 300 series as compared to the 100 hundred series numbers in FIGS. 1A and 1B. Specifically, a locking member of FIGS. 3A and 3B is disk shaped as compared to the cylindrical shaped lock member of FIGS. 1A and 1B. FIGS. 3A and 3B show a lock member 350 which is flexible (e.g., metal or plastic) and includes an axial through gap. Lock member 350 is similar to lock member 150 in that it can be radially compressed, reducing the gap size, to reduce the general diameter of the disk-shaped lock 350. In FIGS. 3A and 3B, a ledge 323 (similar in structure and function to the ledge 123 in FIGS. 1A and 1B) is formed in a side wall of anchor housing 320.

In a first pre-set configuration, lock member 350 is compressed to a smaller diameter than its at rest diameter and positioned within an axially extending inner wall 322 of anchor housing 320. The at rest diameter of lock member 350 is at least slightly larger than the diameter of inner wall 322 so that after compression and release, lock member 250 flexes outward into engagement with inner wall 322.

Lock member 350 is reconfigured from it first pre-set configuration to its second set configuration, in a similar way as lock member 150. Specifically, when an anchor member (e.g., a threaded rod) is inserted into opening 319 and then into engagement with separable jaws 360, separable jaws 360 securely engage the anchor member with spring 360 biasing the jaws together as described in Applicant's above incorporated prior applications. The separable jaws 360 and the anchor member are now locked together axially. A downward force on the anchor member results in a downward force on separable jaws 370 which compresses flexible jaw-ring 370 and lowers separable jaws 370. With the lowering of separable jaws, spring 340 urges lock member 350 downward. The distance separable jaws 360 is lowered sufficient or just sufficient for lock member 350 to clear ledge 323 and expend below ledge 323 preventing a further raising of lock member 350 past ledge 323. Upon release of the anchor member, a now compressed jaw-ring 370 reacts to urge separable jaws 360 upward into engagement with lock member 350. Lock member 350 in turn engages ledge 323 to axially and compressibly lock separable jaws 360 between lock member 350 and jaw-ring 370.

Figure 6:
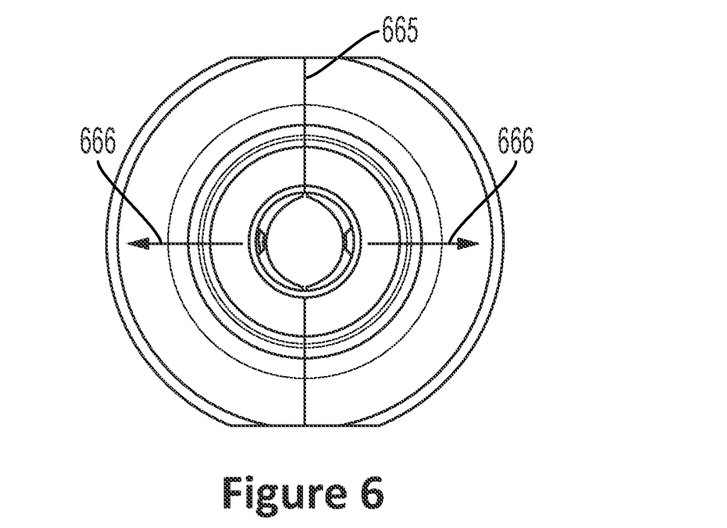
FIG. 6 shows a bottom view of the anchor assembly of FIGS. 1A and 2A.

FIGS. 4A, 4B, 5A and 5B show separable jaws 160A, 160B. Separable jaws 360 include female or internal threads 461 and a lower end 462. Ribs 463, 464 are provided for enhancing the insertion operation of the anchor member into the separable jaws 360 and are shown at respective lower ends 462 of each jaw halves. Separable jaws 160A and 160B are able to move independently, but they must remain generally aligned in order to achieve the final and secure locking engagement with the anchor member. As the anchor member is inserted into opening 319, the leading end of the anchor member engages a lower end 462 of one or both of the separable jaws 360. That engagement is sometimes inefficient. Specifically, it would be beneficial if the anchor member leading end forced lower ends of each jaw member radially outward. It turns out that the closer the anchor member engagement is to the separation plane 665 of separable jaws 360, the less that force results in the desired jaw separation. On the other hand, the farther away from that separation plane 665 the anchor member engagement occurs, the higher the desired separation forces are in the separation direction as shown by separation arrows 666 (See FIG. 6).

To increase the chances that anchor member insertion will result in desirable jaw separation, ribs 463, 464 are provided at lower ends 462 of separable jaws 360 at a position furthest away or distal from separation plane 665. A positioning of ribs 463, 464 near or within 15° in either direction of that distal position may work satisfactorily also. Ribs 463, 464 may include a tapered engagement face which has a lessening radius in a direction from the lower end 462 to the opposite end of the jaw 360.

Figure 7:
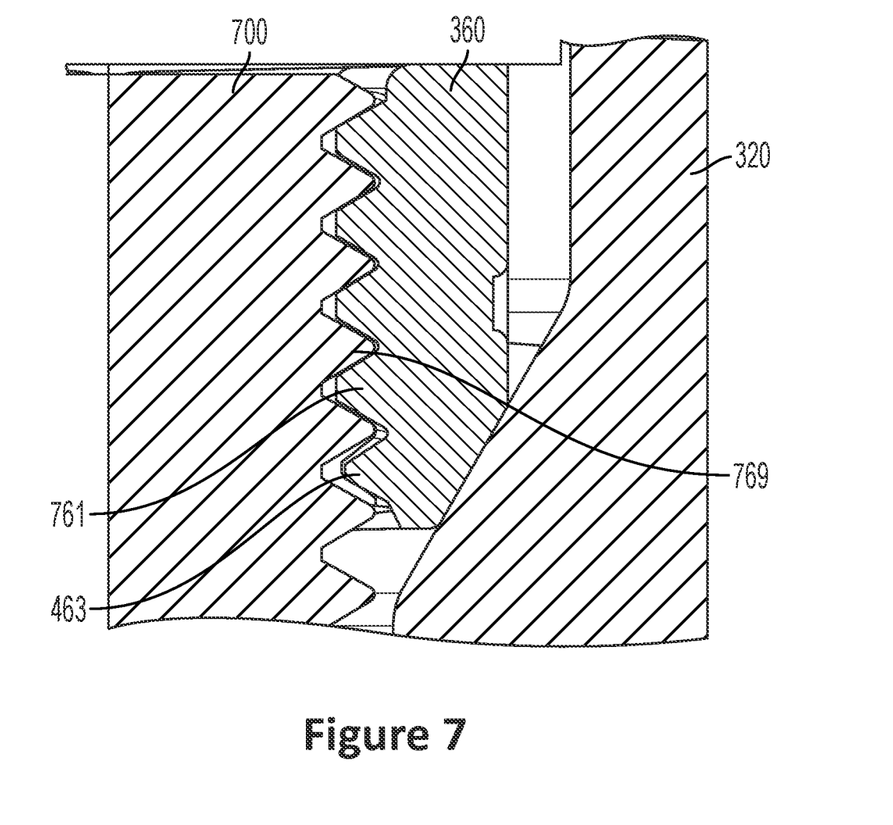
FIG. 7 shows an enlarged partial side cross-sectional view of the jaw member of FIG. 1A engaged with a threaded engagement member.

FIG. 7 shows a partial cross-sectional side view of an anchor member 700 inserted into separable jaws 360. This cross-sectional view through the jaws 360 is in a plane through ribs 464, 463 and perpendicular to separation plane 665. Rib 464 is positioned on jaw 360 at a central position and between threads 761 and lower jaw end 462. The crest of rib 463 may extend radially inward to a lesser extent than the crests 761 of the threads of separable jaws 360. Therefore, an anchor member 700 inserted into opening 319 first engages ribs 463, 464 to separate a lower end of jaws 360 before the threads 761 of those jaws 360 are biased back into engagement with the threads of the anchor member 769.

The invention claimed is:

1. A cast-in-place anchor assembly for anchoring objects to a concrete structure after concrete pouring and concrete setting, the objects fastened to an elongated load bearing member which is connected to the anchor assembly, the cast-in-place anchor assembly comprising:
   an anchor housing, the anchor housing including an opening therein along a longitudinal axis thereof for receiving the elongated load bearing member, the anchor housing also including a jaw assembly housed in the anchor housing, the jaw assembly for lockingly engaging and axially constraining the elongated load bearing member relative to the anchor housing,
   the jaw assembly including separable jaws and a bias member for biasing the jaws toward each other, the jaw assembly further including a compressible member between the jaws and the anchor housing, the jaws including a reconfigurable lock structure,
wherein, in a first anchor assembly configuration, the reconfigurable lock structure has a first configuration that allows the jaws to move axially relative to the anchor housing and in a second anchor assembly configuration the reconfigurable lock structure reconfigures by compression of the compressible member to further limit the relative axial movement of the jaws,
wherein the further limiting of the relative axial movement of the jaws is a result of trapping the jaws between the reconfigurable lock structure and the compressible member.

2. The cast-in-place anchor assembly of claim 1, wherein the reconfigurable lock structure is a flexible member and the elongated load bearing member is threaded.

3. The cast-in-place anchor assembly of claim 1, wherein the reconfigurable lock structure is an expandable member.

4. The cast-in-place anchor assembly of claim 1, wherein the reconfigurable lock structure is a metal member.

5. The cast-in-place anchor assembly of claim 1, wherein the reconfigurable lock structure is a contractible member.

6. A cast-in-place anchor assembly for anchoring objects to a concrete structure after concrete pouring and concrete setting, the objects fastened to an elongated load bearing member which is connected to the anchor assembly, the cast-in-place anchor assembly comprising:

an anchor housing, the anchor housing including an opening therein along a longitudinal axis thereof for receiving the elongate load bearing member, the anchor housing also including a jaw assembly housed in the anchor housing, the jaw assembly for lockingly engaging and axially constraining the elongate load bearing member relative to the anchor housing, the jaw assembly including separable jaws and a bias member for biasing the jaws toward each other, the jaw assembly further including a compressible member between the jaws and the anchor housing, the jaws including a reconfiqurable lock structure, wherein, in a first anchor assembly configuration, the reconfiqurable lock structure has a first configuration that allows the jaws to move axially relative to the anchor housing and in a second anchor assembly configuration the reconfiqurable lock structure reconfigures by compression of the compressible member to further limit the relative axial movement of the jaws, wherein the reconfigurable lock structure is a ring-shaped flexible member.

7. The cast-in-place anchor assembly of claim 1, wherein the separable jaws include threaded interior surfaces.

8. The cast-in-place anchor assembly of claim 1, wherein the separable jaws include a separator projection thereon, and wherein the separator projection includes an inclined surface.

9. A cast-in-place anchor assembly for anchoring objects to a concrete structure after concrete pouring and concrete setting, the objects fastened to an elongated load bearing member which is connected to the anchor assembly, the cast-in-place anchor assembly comprising:

an anchor housing, the anchor housing including an opening therein along a longitudinal axis thereof for receiving the elongate load bearing member, the anchor housing also including a jaw assembly housed in an anchor assembly, the anchor assembly for lockingly engaging and axially constraining the elongate load bearing member relative to the anchor housing, the jaw assembly including separable jaws and the anchor assembly including a bias member for biasing the separable jaws toward each other, the anchor assembly further including a reconfigurable locking structure, the reconfigurable locking structure disposed above the separable jaws and wherein, in a first configuration the reconfigurable locking structure is able to move axially within the anchor housing, and in a second configuration the locking structure is constrained axially within the anchor housing to prevent further upward movement of the separable jaws wherein the prevention of the further upward movement is a result of trapping the jaws between the reconfigurable locking structure and the compressible member.

10. The cast-in-place anchor assembly of claim 9, wherein the separable jaws include a separator projection thereon, and wherein the separator projection includes an inclined surface.

11. The cast-in-place anchor assembly of claim 10, wherein the inclined surface has a decreasing radius moving axially away from a bottom of the separable jaws.

12. The cast-in-place anchor assembly of claim 10, wherein a threaded rod inserted into the opening along the longitudinal axis engages the inclined surface to urge lower ends of the jaws radially outward.

13. The cast-in-place anchor assembly of claim 10, wherein the inclined surface is positioned on the separable jaws distal from a separation plane of the jaws so that a force caused by the elongate load bearing member against the inclined surface acts generally perpendicular to the separation plane.

* * * * *